(12) United States Patent
Morotomi et al.

(10) Patent No.: US 9,714,050 B2
(45) Date of Patent: Jul. 25, 2017

(54) COLLISION AVOIDANCE ASSISTANCE DEVICE AND COLLISION AVOIDANCE ASSISTANCE METHOD

(71) Applicant: TOYOTA JIDOSHA KABUSHIKI KAISHA, Toyota-shi, Aichi (JP)

(72) Inventors: Kohei Morotomi, Toyota (JP); Yoshihisa Yamada, Nagoya (JP); Eiji Kasai, Toyota (JP); Tomonori Akiyama, Shizuoka (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/770,915

(22) PCT Filed: Mar. 28, 2013

(86) PCT No.: PCT/JP2013/059310
§ 371 (c)(1),
(2) Date: Aug. 27, 2015

(87) PCT Pub. No.: WO2014/155615
PCT Pub. Date: Oct. 2, 2014

(65) Prior Publication Data
US 2016/0009318 A1    Jan. 14, 2016

(51) Int. Cl.
*B62D 15/02* (2006.01)
*B60T 7/22* (2006.01)

(52) U.S. Cl.
CPC ............ *B62D 15/0265* (2013.01); *B60T 7/22* (2013.01); *B62D 15/025* (2013.01); *B60T 2201/022* (2013.01); *B60T 2260/02* (2013.01)

(58) Field of Classification Search
CPC .................................................. B62D 15/0265
See application file for complete search history.

(56) References Cited

U.S. PATENT DOCUMENTS

| 6,238,021 | B1 | 5/2001 | Sugimoto | |
|---|---|---|---|---|
| 8,301,343 | B2 * | 10/2012 | Tanimoto | B60T 7/12 180/271 |
| 2008/0091321 | A1 * | 4/2008 | Nishikawa | B60W 30/12 701/44 |

(Continued)

FOREIGN PATENT DOCUMENTS

| CN | 102806910 A | 12/2012 |
|---|---|---|
| DE | 199 26 744 A1 | 12/1999 |

(Continued)

*Primary Examiner* — Redhwan k Mawari
*Assistant Examiner* — Anshul Sood
(74) *Attorney, Agent, or Firm* — Sughrue Mion, PLLC

(57) ABSTRACT

A collision avoidance assistance device configured to perform driver steering assistance to avoid a collision between a vehicle and an obstacle, the device includes a steering control unit configured to perform the steering assistance in a case where it is determined that there is a possibility of the collision between the vehicle and the obstacle. During a period from commencement of the steering assistance to elapsing of a first time determined by response characteristics of a lateral acceleration of the vehicle, the steering control unit is configured to rotate a steering wheel of the vehicle in a collision avoidance direction by a control amount determined based on a steering holding force of the driver.

5 Claims, 10 Drawing Sheets

(56) References Cited

U.S. PATENT DOCUMENTS

2008/0255729 A1 10/2008 Ichinose et al.
2010/0121532 A1 5/2010 Urai et al.
2012/0310480 A1 12/2012 Schmidt

FOREIGN PATENT DOCUMENTS

| EP | 1 884 449 A1 | 2/2008 |
|----|--------------|--------|
| JP | 9207801 A | 8/1997 |
| JP | 2000-62635 A | 2/2000 |
| JP | 2008247327 A | 10/2008 |
| JP | 2008265362 A | 11/2008 |
| JP | 200940115 A | 2/2009 |

* cited by examiner

Fig.6
(a)
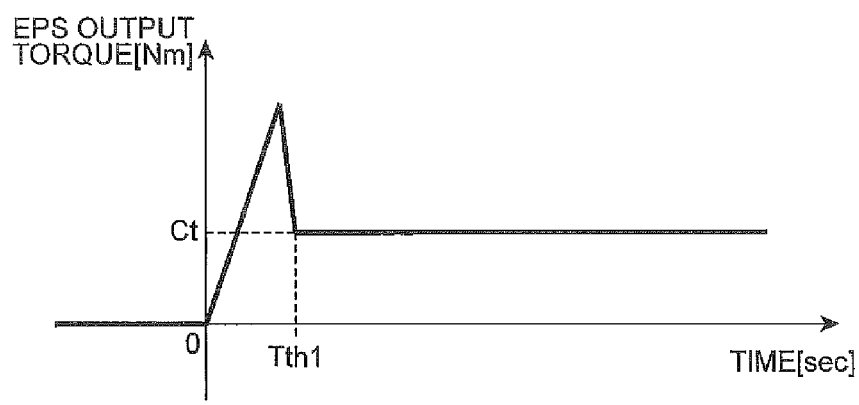
(b)
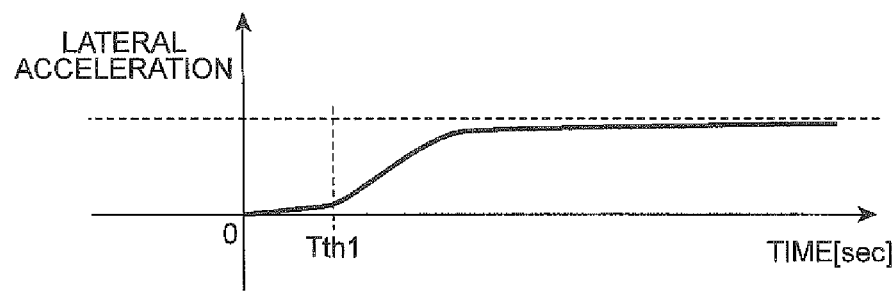

Fig.10
(a)
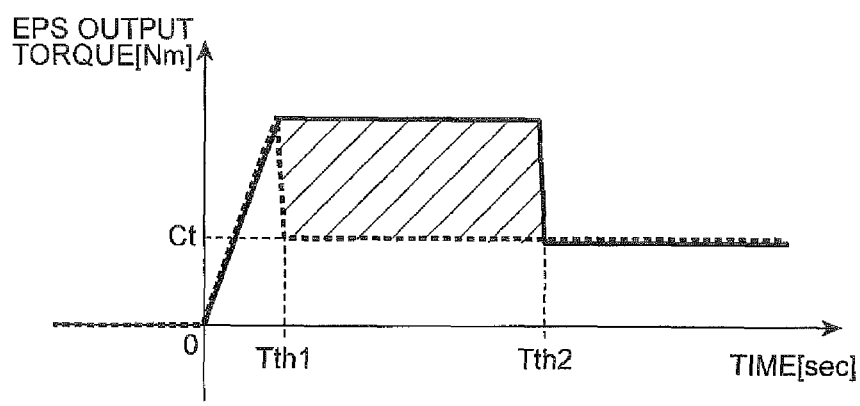
(b)
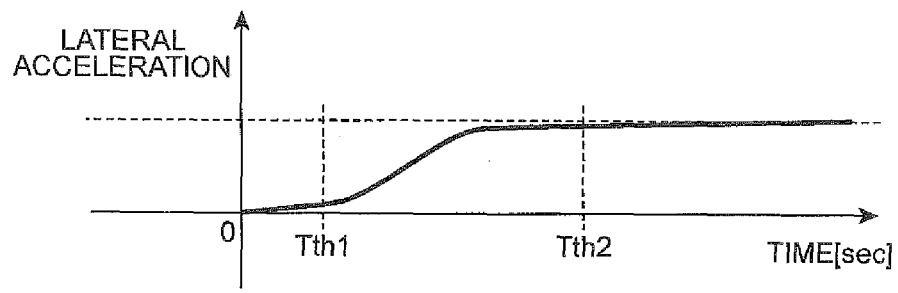

COLLISION AVOIDANCE ASSISTANCE DEVICE AND COLLISION AVOIDANCE ASSISTANCE METHOD

CROSS REFERENCE TO RELATED APPLICATIONS

This application is a National Stage of International Application No. PCT/JP2013/059310, filed on Mar. 28, 2013, the contents of all of which are incorporated herein by reference in their entirety.

TECHNICAL FIELD

The present invention relates to a collision avoidance assistance device and a collision avoidance assistance method.

BACKGROUND ART

There is a driving assistance device by which a collision can be avoided by performing a steering control in a case where there is a possibility of the collision with an obstacle such as a pedestrian (refer to Patent Literature 1).

CITATION LIST

Patent Literature

[Patent Literature 1] Japanese Unexamined Patent Application Publication No. 2009-40115
[Patent Literature 2] Japanese Unexamined Patent Application Publication No, 2008-265362
[Patent Literature 3] Japanese Unexamined Patent Application Publication No. 9-207801
[Patent Literature 4] Japanese Unexamined Patent Application Publication No. 2008-247327

SUMMARY OF INVENTION

Technical Problem

In the driving assistance device described above, if a steering control amount by a system is too large, a sideslip or the like occurs, and thus, there is a possibility of giving an uncomfortable feeling to a driver. On the other hand, it is known that the driver is operating the steering wheel by a certain degree of steering holding force during ordinary driving. For this reason, in a case where the steering control amount by the system is less than the steering holding force of the driver, there is a problem in that the steering control by the system may be cancelled under the unconsciousness of the driver. Like this, if the steering control amount by the system is too large, there is a problem in that the driver may feel an uncomfortable feeling, and if the steering control amount by the system is too small, there is a problem in that the steering control by the system may be cancelled while the driver is not aware of the operation of the system.

An object of the present invention is to provide a collision avoidance assistance device and a collision avoidance assistance method in which the uncomfortable feeling to the driver can be suppressed and the possibility of a steering control being cancelled can be decreased.

Solution to Problem

According to an aspect of the present invention, there is provided a collision avoidance assistance device that is a device configured to perform driver steering assistance to avoid a collision between a vehicle and an obstacle. The collision avoidance assistance device includes a steering control unit configured to perform the steering assistance in a case where it is determined that there is a possibility of the collision between the vehicle and the obstacle. During a period from commencement of the steering assistance to elapsing of a first time determined by response characteristics of a lateral acceleration of the vehicle, the steering control unit is configured to rotate a steering wheel of the vehicle in a collision avoidance direction by a control amount determined based on a steering holding force of the driver.

In the collision avoidance assistance device, during the period from commencement of the steering assistance to elapsing of the first time, the steering wheel is rotated to the collision avoidance direction by the control amount determined based on the steering holding force of the driver. In addition, the rotation of the steering wheel by the control amount is performed continuously from commencement of the steering assistance to elapsing of the first time determined by response characteristics of a lateral acceleration of the vehicle. Since it takes a certain time from the starting of the rotation of the steering wheel to the generation of the lateral acceleration on the vehicle, in a case where the first time is set shorter than this time, it is possible to decrease the lateral acceleration generated on the vehicle. In addition, in a case where the steering wheel is rotated by the control amount that exceeds the steering holding force of the driver, it is possible to make the driver recognize the operation of the steering assistance. As a result, the uncomfortable feeling to the driver can be suppressed and it is possible to decrease the possibility of the steering assistance being cancelled. In addition, since the steering wheel is rotated in the collision avoidance direction, it is possible to make the driver recognize the direction of the collision avoidance.

In the collision avoidance assistance device in another aspect of the present invention, the control amount may be set to a value greater than the steering holding force. In a case where the steering wheel is rotated by the control amount greater than the steering holding force of the driver, the rotation of the steering wheel can be prevented from being cancelled by the steering holding force of the driver, and thus, it is possible to make the driver reliably recognize the operation of the steering assistance and the collision avoidance direction.

In the collision avoidance assistance device in another aspect of the present invention, the first time may be set to be shorter than a delay time from the starting of the steering or turning of the vehicle to the generation of the lateral acceleration on the vehicle. By setting the first time to be shorter than a delay time from the starting of the steering or turning of the vehicle to the generation of the lateral acceleration on the vehicle, it is possible to rotate the steering wheel while suppressing the lateral acceleration generated on the vehicle. Therefore, it is possible to make the driver recognize the operation of the steering assistance and the collision avoidance direction while suppressing the uncomfortable feeling to the driver. As a result, it is possible to decrease the possibility of the steering assistance being cancelled.

In the collision avoidance assistance device in another aspect of the present invention, at the time of or after commencement of the steering assistance, the steering control unit may be configured to end the steering assistance in response to detecting the steering operation of the steering wheel by the driver as being equal to or greater than a predetermined amount. At the time of operating the steering assistance, in a case where the steering operation of the steering wheel by the driver is equal to or greater than the predetermined amount, it is considered that the driver has an intention of the avoidance operation by him/herself. Therefore, it is possible to give a priority to the avoidance operation by the driver by ending the steering assistance in such a case.

The collision avoidance assistance device in another aspect of the present invention may further include a target control amount calculation unit configured to calculate a target control amount for travelling on a target path through which the vehicle is to travel for avoiding the collision with the obstacle and a control amount adjustment unit configured to obtain a designated control amount by adding an initial control amount to the target control amount during the period from commencement of the steering assistance to elapsing of the first time, and to adopt the target control amount as the designated control amount after the first time has elapsed since commencement of the steering assistance. The steering control unit may be configured to perform the steering assistance by rotating the steering wheel by the designated control amount. In this case, during the period from commencement of the steering assistance to elapsing of the first time, it is possible to rotate the steering wheel by the control amount in which the initial control amount is added to the target control amount and to rotate the steering wheel by the target control amount after the first time has elapsed. As a result, the uncomfortable feeling to the driver can be suppressed and it is possible to decrease the possibility of the steering assistance for avoiding the collision being cancelled.

The collision avoidance assistance device in another aspect of the present invention, may further include a gear ratio control unit configured to variably control a gear ratio which is a ratio between a rotation angle of the steering wheel of the vehicle and a tire angle of the vehicle. The gear ratio control unit may be configured to set the gear ratio such that the rotation angle of the steering wheel becomes greater than the tire angle during a period from commencement of the steering assistance to elapsing of a second time which is longer than the first time determined by response characteristics of a lateral acceleration of the vehicle. During the period from commencement of the steering assistance to elapsing of the second time, the steering control unit may be configured to rotate the steering wheel in the collision avoidance direction by the control amount determined based on the steering holding force of the driver.

In the collision avoidance assistance device, during the period from commencement of the steering assistance to elapsing of the second time, the steering wheel is rotated to the collision avoidance direction by the control amount determined based on the steering holding force of the driver. During the period from commencement of the steering assistance to elapsing of the second time, the gear ratio is set by the gear ratio control unit such that the rotation angle of the steering wheel becomes large compared to the tire angle. For this reason, since the rotation angle of the steering angle can be increased while suppressing the increase of the tire angle, even though the steering wheel is rotated by the control amount that exceeds the steering holding force of the driver during the period from commencement of the steering assistance to elapsing of the second time which is longer than the first time determined by response characteristics of the lateral acceleration of the vehicle, it is possible to suppress the increase of the lateral acceleration. In addition, in a case where the steering wheel is rotated by the control amount that exceeds the steering holding force of the driver, it is possible to make the driver recognize the operation of the steering assistance. As a result, the uncomfortable feeling to the driver can be suppressed and it is possible to decrease the possibility of the steering assistance being cancelled. In addition, since the steering wheel is rotated in the collision avoidance direction, it is possible to make the driver recognize the direction of the collision avoidance.

According to another aspect of the present invention, there is provided a collision avoidance assistance method that is a method for performing driver steering assistance to avoid a collision between a vehicle and an obstacle. The collision avoidance assistance method includes a steering control step of performing the steering assistance in a case where it is determined that there is a possibility of the collision between the vehicle and the obstacle. In the steering control step, during a period from commencement of the steering assistance to elapsing of a first time determined by response characteristics of a lateral acceleration of the vehicle, the steering wheel of the vehicle is rotated in the collision avoidance direction by the control amount determined based on the steering holding force of the driver.

In the collision avoidance assistance method, during the period from commencement of the steering assistance to elapsing of the first time, the steering wheel is rotated to the collision avoidance direction by the control amount determined based on the steering holding force of the driver. In addition, the rotation of the steering wheel by the control amount is performed during the period from commencement of the steering assistance to elapsing of the first time determined by response characteristics of a lateral acceleration of the vehicle. Since it takes a certain time from the starting of the rotation of the steering wheel to the generation of the lateral acceleration on the vehicle, in a case where the first time is set shorter than this time, it is possible to decrease the lateral acceleration generated on the vehicle. In addition, in a case where the steering wheel is rotated by the control amount that exceeds the steering holding force of the driver, it is possible to make the driver recognize the operation of the steering assistance. As a result, the uncomfortable feeling to the driver can be suppressed and it is possible to decrease the possibility of the steering assistance being cancelled. In addition, since the steering wheel is rotated in the collision avoidance direction, it is possible to make the driver recognize the direction of the collision avoidance.

Advantageous Effects of Invention

According to the present invention, it is possible to decrease the possibility of the steering assistance being cancelled while suppressing an uncomfortable feeling to the driver.

BRIEF DESCRIPTION OF DRAWINGS

FIG. 6 includes (a) a diagram illustrating an example of a time change of an EPS output steering torque in the collision avoidance assistance device in FIG. 1, and (b) a diagram illustrating an example of a time change of a lateral acceleration in the collision avoidance assistance device in FIG. 1.

FIG. 10 includes (a) a diagram illustrating an example of a time change of an EPS output steering torque in the collision avoidance assistance device in FIG. 7, and (b) a diagram illustrating an example of a time change of a lateral acceleration in the collision avoidance assistance device in FIG. 7.

DESCRIPTION OF EMBODIMENTS

Hereinafter, embodiments of the present invention will be described in detail with reference to the drawings.

First Embodiment

Figure 1:
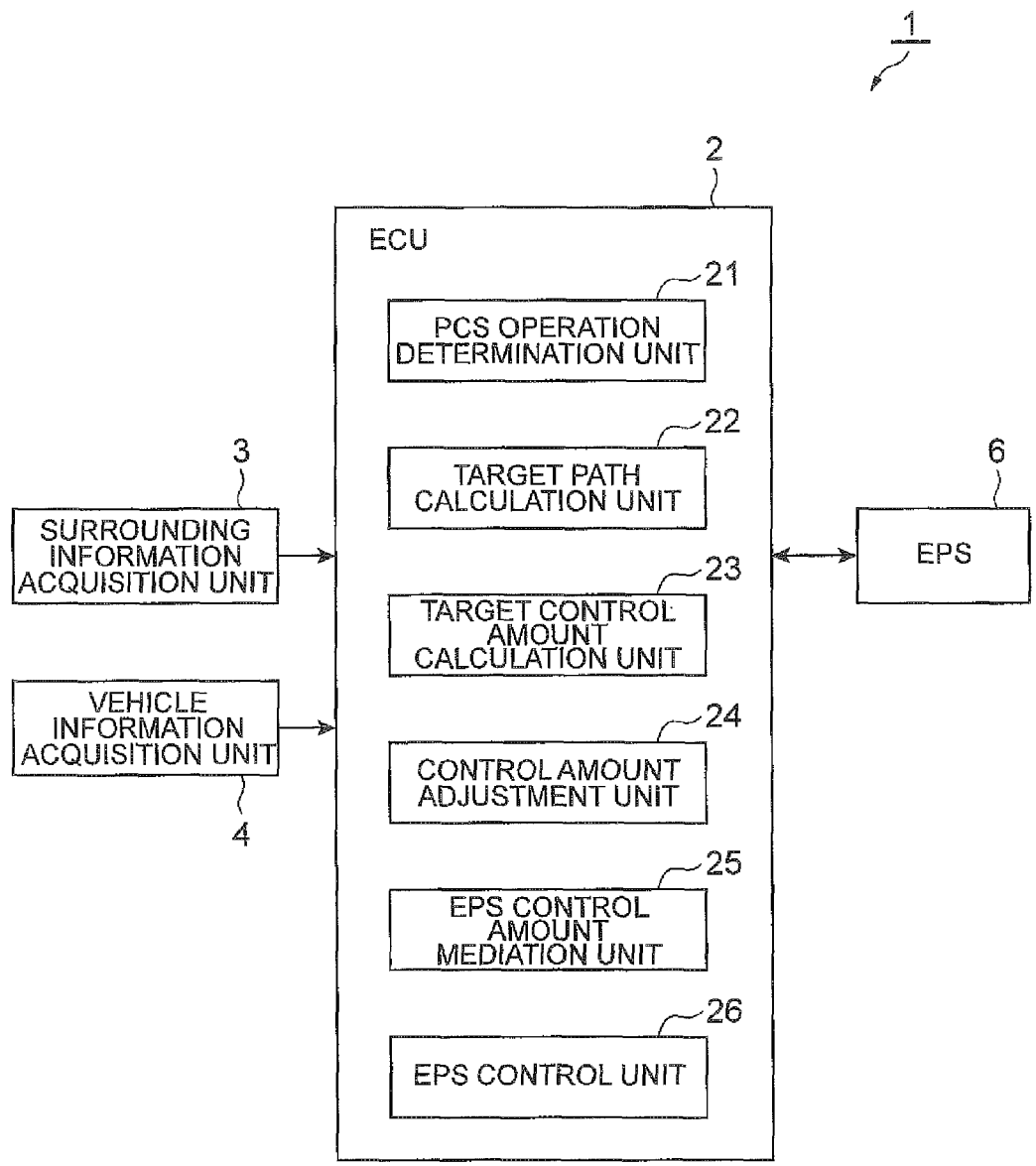
FIG. 1 is a block configuration diagram of a collision avoidance assistance device in a first embodiment.

FIG. 1 is a block configuration diagram of a collision avoidance assistance device in the first embodiment. The collision avoidance assistance device is a device configured to assist a vehicle control using a pre-crash safety system (PCS). The PCS is a system for avoiding a collision between the vehicle and an object detected around the vehicle.

As illustrated in FIG. 1, a collision avoidance assistance device 1 includes an electronic control unit (ECU) 2, a surrounding information acquisition unit 3, a vehicle information acquisition unit 4, and an electronic controlled power steering device (EPS) 6.

The surrounding information acquisition unit 3 has a function of acquiring information around the vehicle. The surrounding information acquisition unit 3 outputs, for example, obstacle information and travelable area information to the ECU 2. The obstacle information is information relating to a detected obstacle. The travelable area information is information relating to an area where the vehicle can travel. The surrounding information acquisition unit 3 includes, for example, radar and an image sensor. The radar detects an obstacle around the vehicle using a millimeter wave, a laser, or the like, and outputs the obstacle information relating to the detected obstacle to the ECU 2. The image sensor is, for example, a monocular camera or a stereo camera, and images a predetermined range around the vehicle for each predetermined time and generates image data. The image sensor outputs the obstacle information and the travelable area information to the ECU 2 based on the generated image data.

The vehicle information acquisition unit 4 has a function of acquiring vehicle information indicating the travelling state of the vehicle. The vehicle information acquisition unit 4 outputs the acquired vehicle information to the ECU 2. The vehicle information acquisition unit 4 includes, for example, a tire angle sensor for detecting a tire angle, a steering torque sensor for detecting a steering torque (steering force) of a steering, a vehicle speed sensor for detecting a speed (travelling speed) of the vehicle, a global positioning system (GPS) receiver for detecting a position of the vehicle, and a yaw rate sensor for detecting a yaw rate of the vehicle. As examples of the vehicle information, there are the tire angle, the steering torque, the speed of the vehicle, and the position of the vehicle.

The EPS 6 is a steering assistance system in which a reaction force against the steering wheel is generated, and is a power steering system for controlling the tire angle by adjusting an EPS control amount such as a steering torque of the vehicle.

Figure 2:
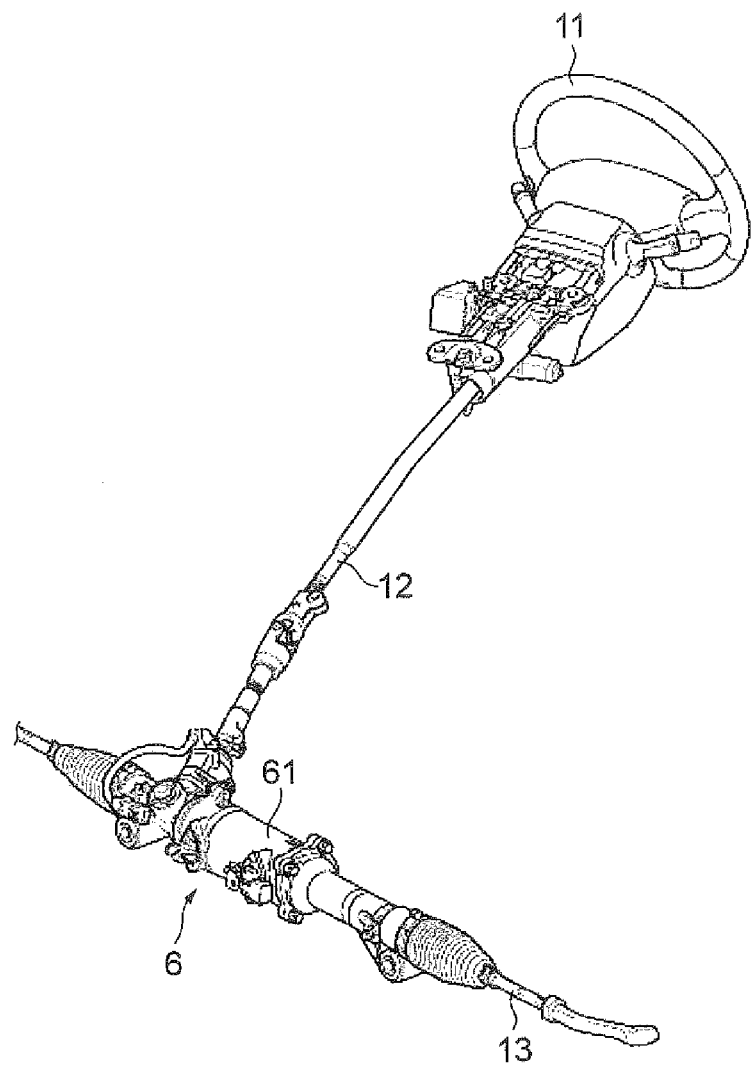
FIG. 2 is a perspective diagram illustrating a main part of an EPS in FIG. 1.

FIG. 2 is a perspective diagram illustrating a main part of an EPS 6. As illustrated in FIG. 2, a steering wheel 11 is drivingly connected to the EPS 6 via a steering shaft 12. The EPS 6 is, for example, a rack-and-pinion type that is driven in response to the operation of the steering wheel 11 by the driver, and is a motorized rack coaxial type here. The EPS 6 turns tires of right and left front wheels via a rack bar 13. Specifically, the EPS 6 includes a housing 61 that houses a motor and a conversion mechanism. The conversion mechanism is configured to convert a rotation torque of the motor in accordance with the EPS control amount to a force of the rack bar 13 moving in a reciprocating direction and generate an auxiliary steering force that causes the rack bar 13 to be relatively driven with respect to the housing 61.

The EPS 6 adjusts a tire angle with the rotational movement of the steering wheel 11 of the vehicle. That is, the EPS 6 executes a tire angle control depending on the steering operation by the driver, for example, in synchronization with the steering operation. The EPS 6 realizes the EPS control amount by controlling a current amount in the motor by the ECU 2.

The ECU 2 is an electronic control unit that performs the entire control of the collision avoidance assistance device 1. The ECU 2 is mainly configured with a computer including a central processing unit (CPU), a read only memory (ROM), a random access memory (RAM), and the like, and includes an input signal circuit, an output signal circuit, a power circuit, and the like. The ECU 2 includes a PCS operation determination unit 21, a target path calculation unit 22, a target control amount calculation unit 23, a control amount adjustment unit 24, an EPS control amount mediation unit 25, and an EPS control unit 26 (steering control unit).

The PCS operation determination unit 21 has a function of determining whether or not a PCS operation start condition is satisfied. For example, in a case where the obstacle subject to avoid for the vehicle is determined to exist based on the obstacle information output from the surrounding information acquisition unit 3, the PCS operation determination unit 21 determines that the PCS operation start condition is satisfied. In a case where the PCS operation start condition is determined to be satisfied, the PCS operation determination unit 21 operates the PCS.

In addition, the PCS operation determination unit 21 has a function of determining whether or not the PCS operation end condition is satisfied. For example, in a case where it is determined that the avoidance of the collision was possible with respect to the obstacle subject to collision avoidance based on the obstacle information output from the surrounding information acquisition unit 3, the PCS operation determination unit 21 determines that the PCS operation end condition is satisfied. In addition, for example, in a case where it is determined that there is no longer the possibility of the collision with respect to the obstacle subject to collision avoidance due to a change in the environment around the vehicle, the PCS operation determination unit 21 determines that the PCS operation end condition is satisfied. In addition, for example, in a case where it is detected that a cancellation operation to end the PCS is performed by the driver, the PCS operation determination unit 21 determines that the PCS operation end condition is satisfied.

Generally, even during the PCS operation, if it is determined that the driver has an intention of avoidance operation by him/herself, it is desirable to cancel the PCS operation. For this reason, in a case where it is detected that a steering operation amount of the steering wheel by the driver is equal to or greater than a predetermined amount based on the vehicle information acquired by the vehicle information acquisition unit 4, the PCS operation determination unit 21 may determine that the PCS operation end condition is satisfied.

The target path calculation unit 22 has a function of calculating a target path which is a path through which the vehicle is to pass. The target path calculation unit 22 calculates the target path, for example, based on the obstacle information and the travelable area information output from the surrounding information acquisition unit 3. In this case, the target path calculation unit 22 sets, for example, the path on which the vehicle can avoid the obstacle among the travelable area as the target path. Not limited to the method described above, the target path calculation unit 22 may calculate the target path using another method.

The target control amount calculation unit 23 has a function of calculating a target control amount Ct which is a control amount necessary for travelling the target path calculated by the target path calculation unit 22. The target control amount calculation unit 23 calculates the target control amount Ct based on, for example, the vehicle information output by the vehicle information acquisition unit 4 and the vehicle specification values set in advance. As examples of the vehicle information used for calculating the target control amount Ct, there are the position of the vehicle, the vehicle speed, the steering torque, and the tire angle. As example of the target control amount Ct, the steering torque, the tire angle, and an electric current in the steering motor can be exemplified, which are the control amount for travelling the target path.

The control amount adjustment unit 24 has a function of causing the driver to recognize the operation of the PCS so as not to unconsciously cancel the PCS control. The control amount adjustment unit 24 measures a time elapsed since it is determined by the PCS operation determination unit 21 that the PCS operation start condition is satisfied (hereinafter, in some cases, referred to as "a time when the PCS operation starts"), and determines whether or not the elapsed time exceeds a first time Tth1. The first time Tth1 is a time determined by the response characteristics of the lateral acceleration (lateral G) of the vehicle, and is the time during which it is possible to suppress the lateral acceleration generated in the vehicle even though the steering wheel and tires operate in accordance with the control of the EPS 6. The first time Tth1 is set in the control amount adjustment unit 24 in advance.

Figure 3:
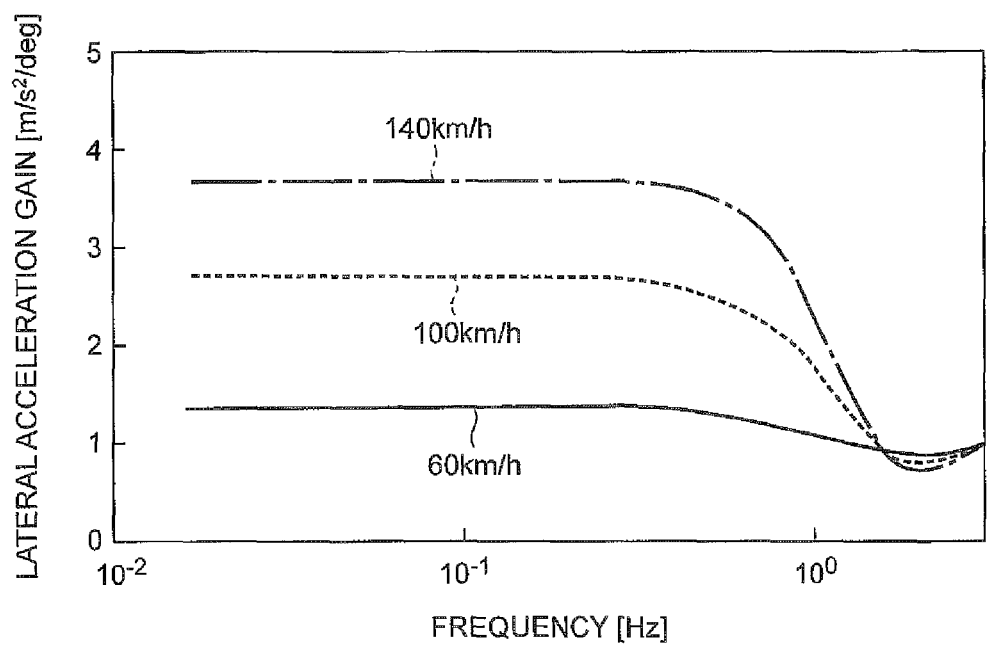
FIG. 3 is a diagram illustrating an example of frequency response characteristics of a lateral acceleration.

FIG. 3 is a diagram illustrating an example of frequency response characteristics of the lateral acceleration. The horizontal axis indicates the frequency and the vertical axis indicates the lateral acceleration gain. As illustrated in FIG. 3, it can be understood that the lateral acceleration gain decreases at the frequency of 1 Hz or higher regardless of the vehicle speed. That is, since there is a delay time from the starting of the steering or turning of the vehicle to the generation of the lateral acceleration of the vehicle, even if the steering wheel is significantly rotated during a time shorter than the delay time, the lateral acceleration generated in the vehicle is suppressed. Therefore, the first time Tth1 may be set, for example, to approximately 0.1 second which corresponds to 10 Hz.

In a case where it is determined that the elapsed time does not exceed the first time Tth1, the control amount adjustment unit 24 adds an initial control amount to the target control amount Ct calculated by the target control amount calculation unit 23, and requests the added result as the EPS control amount (designated control amount). The initial control amounts having a positive value and a negative value are set in advance by the control amount adjustment unit 24. Each initial control amount has a value greater than the steering holding force of the driver during the straight forward travelling as a peak value Cp. The peak value Cp of the initial control amount is, for example, a value approximately twice the steering holding force measured at a Belgian road which is assumed to have an environment in which the road surface disturbance is large.

The peak value Cp of the initial control amount may be set to a value greater than a value in which the maximum steering force (approximately 66 N) that can be instantaneously operated by a person is converted to a steering shaft force using the wheel diameter of the steering wheel.

In order to cause the driver to intuitively recognize the collision avoidance direction by the PCS, in a case where the target control amount Ct calculated by the target control amount calculation unit 23 is a positive value, the control amount adjustment unit 24 adds the initial control amount having the positive value, and in a case where the target control amount Ct calculated by the target control amount calculation unit 23 is a negative value, adds the initial control amount having the negative value.

The control amount adjustment unit 24 may perform a feedback control of the initial control amount based on the vehicle information relating to the rotating angle from the steering angle sensor of the vehicle information acquisition unit 4. For example, the control amount adjustment unit 24 may increase the initial control amount until the rotating angle of the steering wheel reaches a predetermined angle.

Figure 4:
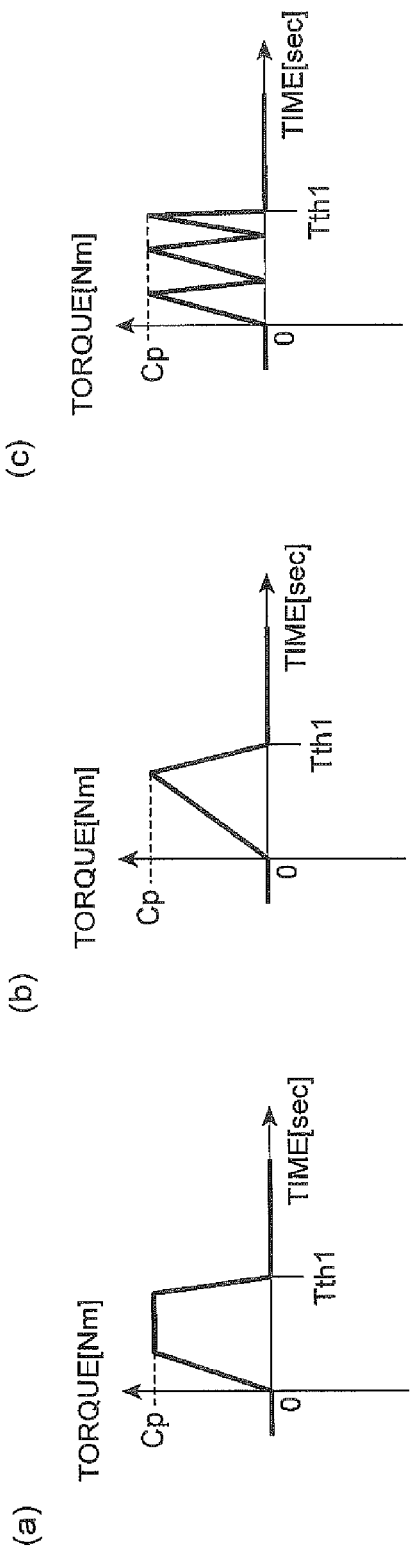
FIG. 4 is a diagram illustrating specific examples of the output waveform of an initial steering torque.

FIG. 4 is a diagram illustrating specific examples of output waveform of the initial steering torque which is an example of the initial control amount. The horizontal axis indicates the time elapsed since the PCS operation starts and the vertical axis indicates the initial steering torque. Here, the description is made using the steering torque, but another control amount may be used. In this example, a waveform of the initial control amount in a case where the target control amount Ct calculated by the target control amount calculation unit 23 is the positive value is illustrated. As illustrated in FIG. 4, the waveform of the initial control amount is output during only a period from the time when the PCS operation starts to the first time Tth1, and has the peak value Cp. As above, the waveform of the initial control amount can be obtained in various shapes, but it is preferable that the waveform does not vibrate across the positive and negative.

On the other hand, in a case where it is determined that the elapsed time exceeds the first time Tth1, the control amount adjustment unit 24 requests the target control amount Ct calculated by the target control amount calculation unit 23 as the EPS control amount (designated control amount).

The EPS control amount mediation unit 25 has a function of mediating the EPS control amounts with another control using the EPS 6. As the EPS control amount other than the EPS control amount requested by the PCS (that is, the EPS control amount requested by the control amount adjustment unit 24), there is an EPS control amount requested from the control such as an assist control with respect to the ordinary steering of the driver, a cooperative control for the prevention of sideslip and a control to make it easier to rotate back the steering wheel. The EPS control amount mediation unit 25 determines the EPS control amount according to a priority degree set to those controls.

The EPS control amount mediation unit 25, for example, determines the priority degree of each control as described below. When it is determined that a dangerous state does not occur due to the steering and the driver performs the steering with an intention, the EPS control amount mediation unit 25 gives a priority to the steering by the driver. When it is determined that a dangerous state does not occur due to the steering and the driver is in a state of steering hold or in a state to the extent of putting the hands on the steering wheel, the EPS control amount mediation unit 25 gives the priority to the PCS control. The EPS control amount mediation unit 25 performs the determination of the presence or absence of the driver's intention and the steering hold state based on, for example, the vehicle information from the steering angle sensor or the driver monitoring system of the vehicle information acquisition unit 4. The priority degree for each control may be set in the EPS control amount mediation unit 25 in advance.

The EPS control amount mediation unit 25 calculates the sum of the requested EPS control amount based on, for example, the priority degree of the control. As an example, the EPS control amount mediation unit 25 adds an ordinary assist torque to the steering torque of the driver. When it is determined that the addition resulted value is not a sufficient value for avoiding the collision, the EPS control amount mediation unit 25 further adds the EPS control amount requested by the PCS. In addition, the EPS control amount mediation unit 25 determines the EPS control amount from the addition result value within upper and lower threshold values provided such that the sideslip does not occur.

In addition, the EPS control amount mediation unit 25 may determine whether or not the controls requesting the EPS control amount are in a mutually exclusive relationship. In this case, the EPS control amount mediation unit 25 may reject the request from the controls of which the priority degree is low according to determining the controls requesting the EPS control amount are in a mutually exclusive relationship.

The EPS control unit 26 has a function of controlling the EPS 6 such that the EPS control amount determined by the EPS control amount mediation unit 25 can be realized. The EPS control unit 26 causes the EPS 6 to realize the EPS control amount by, for example, controlling the current amount in the motor of the EPS 6.

Figure 5:
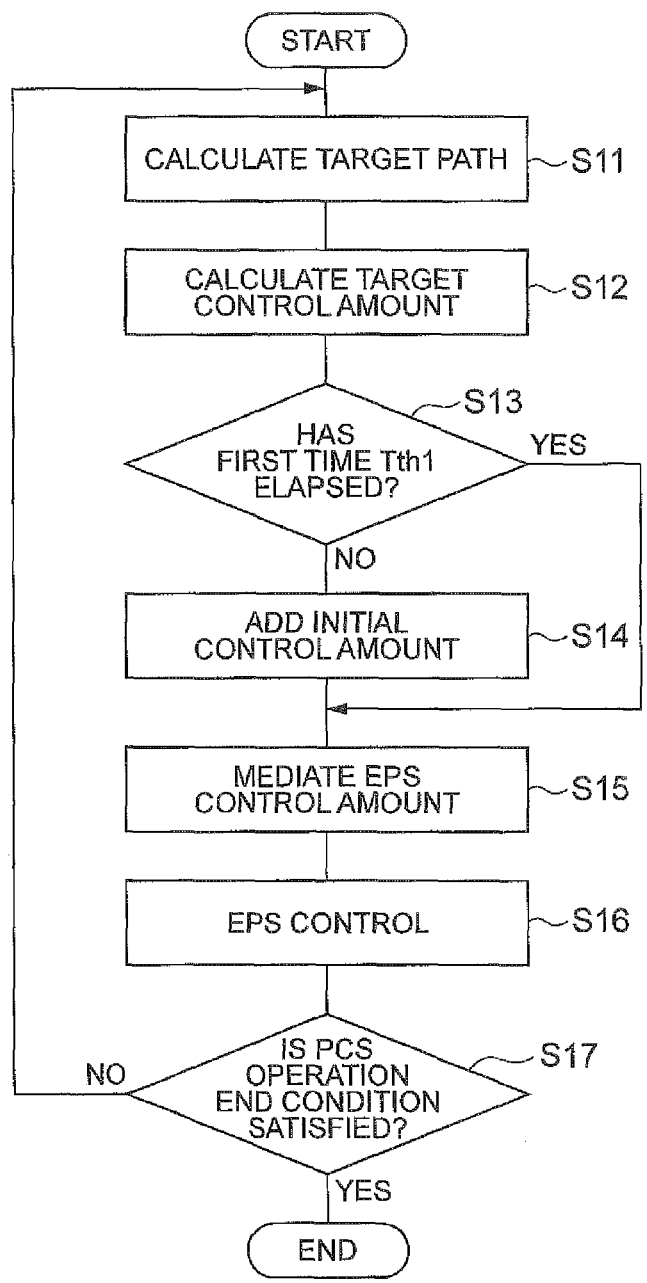
FIG. 5 is a flowchart illustrating an example of processing in the collision avoidance assistance device in FIG. 1.

Next, an example of collision avoidance assistance processing in the collision avoidance assistance device 1 will be described. FIG. 5 is a flowchart illustrating the example of processing in the collision avoidance assistance device 1. The collision avoidance assistance processing starts in accordance with the determination by the PCS operation determination unit 21 that the PCS operation start condition is satisfied. At this time, the control amount adjustment unit 24 starts measuring the time elapsed since the PCS operation starts.

First, the target path calculation unit 22 calculates the target path based on the obstacle information and the travelable area information output by the surrounding information acquisition unit 3 (target path calculation step S11). Then, in order to cause the vehicle to travel along the target path calculated by the target path calculation unit 22 in the target path calculation step S11, the target control amount calculation unit 23 calculates the target control amount Ct based on the vehicle information output from the vehicle information acquisition unit 4 (target control amount calculation step S12).

Subsequently, the control amount adjustment unit 24 determines whether or not the time elapsed since commencement of the PCS operation exceeds the first time Tth1 (initial period of time elapse determination step S13). In the initial period of time elapse determination step S13, in a case where it is determined that the time elapsed since commencement of the PCS operation does not exceed the first time Tth1 (No in initial period of time elapse determination step S13), the control amount adjustment unit 24 adds the initial control amount to the target control amount Ct calculated by the target control amount calculation unit 23 in target control amount calculation step S12, and requests the addition result as the EPS control amount (initial control amount addition step S14).

On the other hand, in initial period of time elapse determination step S13, in a case where it is determined that the time elapsed since commencement of the PCS operation exceeds the first time Tth1 (Yes in initial period of time elapse determination step S13), the control amount adjustment unit 24 requests the target control amount Ct calculated by the target control amount calculation unit 23 in target control amount calculation step S12 as the EPS control amount.

Subsequently, the EPS control amount mediation unit 25 mediates the EPS control amount with another control which uses the EPS 6, and determines the EPS control amount (EPS control amount mediation step S15). Then, the EPS control unit 26 controls the EPS 6 such that the EPS control amount determined by the EPS control amount mediation unit 25 in EPS control amount mediation step S15 can be realized (EPS control step S16, steering control step).

Thereafter, the PCS operation determination unit 21 determines whether or not the PCS operation end condition is satisfied (PCS operation end determination step S17). In PCS operation end determination step S17, in a case where it is determined that the PCS operation end condition is not satisfied (No in PCS operation end determination step S17), the process returns to target path calculation step S11 and the processing tasks from target path calculation step S11 to PCS operation end determination step S17 are performed again.

On the other hand, in PCS operation end determination step S17, in a case where it is determined that the PCS operation end condition is satisfied (Yes in PCS operation end determination step S17), the collision avoidance assistance processing in the collision avoidance assistance device 1 ends.

Next, operational effects of the collision avoidance assistance device 1 will be described. FIG. 6 includes (a) a diagram illustrating an example of a time change of an EPS output steering torque in the collision avoidance assistance device 1, and (b) a diagram illustrating an example of a time change of a lateral acceleration in the collision avoidance assistance device 1. In (a) in FIG. 6, the horizontal axis represents the time elapsed since commencement of the PCS operation and the vertical axis represents the EPS output steering torque. In (b) in FIG. 6, the horizontal axis represents the time elapsed since commencement of the PCS operation and the vertical axis represents the lateral acceleration. Here, the steering torque is used as the EPS control amount. However, another control amount may be used.

In the related art, in a road surface having a small friction coefficient (also referred to as a low-μ, road), it has been difficult to achieve both of suppressing the lateral acceleration occurring in PCS to be small such that the sideslip does not occur and preventing the PCS from being cancelled due to the driver's unconscious suppressing of the steering wheel. For example, regarding the sideslip, even on an icy road which is generally regarded as the most unfavorable environment ($\mu$=0.1), in order to prevent the sideslip from occurring, it is necessary to make the lateral acceleration equal to or lower than approximately 0.1 G. When being converted to the input steering torque, the lateral acceleration of 0.1 G corresponds to approximately 1 Nm of the input steering torque. In the ordinary driving, the driver unconsciously performs steering holding. Sometimes, the driver performs the steering holding with a force of 1 to 2 Nm of input steering torque depending on the characteristics of the vehicle or the characteristics of the road surface. Thus, when the control amount of the PCS is equal to or less than 2 Nm, there is a problem in that the PCS may be cancelled under the unconsciousness of the driver.

On the other hand, as illustrated in FIG. 6, the collision avoidance assistance device 1 rotates the steering wheel with the steering torque in which the initial steering torque is added to the target steering torque Ct during the period from commencement of the PCS operation to elapsing of the first time Tth1, and rotates the steering wheel with the target steering torque Ct after the first time Tth1 has elapsed. This first time Tth1 is determined according to the response characteristics of the lateral acceleration of the vehicle, and is set to a value less than a delay time from the time of the steering wheel rotation starting to the time of the lateral acceleration occurring on the vehicle. For this reason, despite the steering wheel being rotated by the steering torque greater than the target steering torque Ct, it is understood that the increase of the lateral acceleration occurring on the vehicle is suppressed.

In addition, the steering torque output during the period from commencement of the PCS operation to elapsing of the first time Tth1 is greater than the steering holding force of the driver. Therefore, it is possible to reliably rotate the steering wheel, and thus, it is possible to make the driver recognize the PCS operation. As a result, the uncomfortable feeling to the driver can be suppressed and it is possible to decrease the possibility of the steering assistance being cancelled. That is, in the collision avoidance assistance device 1, it is possible to make the driver recognize the PCS operation while suppressing the lateral acceleration by causing the steering torque which exceeds the driver's steering holding force to occur for a short time in the collision avoidance direction of the PCS.

In addition, during the period from commencement of the PCS operation to elapsing of the first time Tth1, the steering torque having the same direction as the direction of the steering assistance of the PCS is output. Therefore, it is possible to make the driver intuitively recognize the direction of the collision avoidance by the PCS. In addition, during the period from commencement of the PCS operation to elapsing of the first time Tth1, the initial steering torque having the same direction as the direction of the steering assistance of the PCS is added. Therefore, after the first time Tth1 has elapsed, it is possible to quickly transit to the collision avoidance steering.

Second Embodiment

Figure 7:
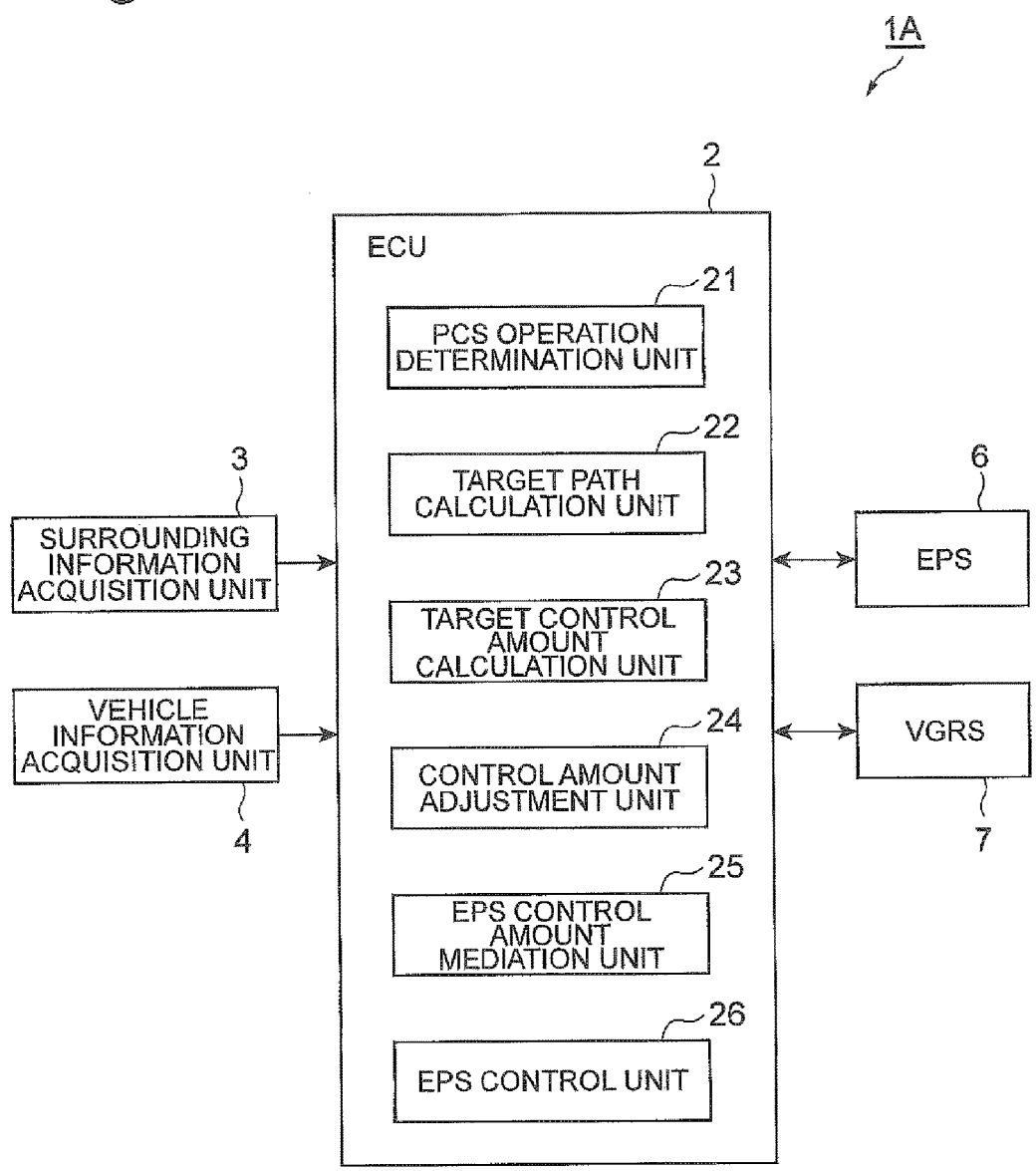
FIG. 7 is a block configuration diagram of a collision avoidance assistance device in a second embodiment.

FIG. 7 is a block configuration diagram of a collision avoidance assistance device in the second embodiment. As illustrated in FIG. 7, a collision avoidance assistance device 1A is different from the collision avoidance assistance device 1 in the point that the collision avoidance assistance device 1A further includes a variable gear ratio steering (VGRS) 7 and in the initial operation of the control amount adjustment unit 24.

The VGRS 7 is a steering assistance system in which the reaction force against the steering wheel is not generated, and is a system for variably controlling a transfer ratio (steering gear ratio) which is the ratio of the turning angle (tire angle, turning angle of the tire) of the turning wheel to the rotation angle of the steering wheel. The VGRS 7 can increase the rotation angle of the steering wheel with the tire angle being maintained by changing the transfer ratio.

Figure 8:
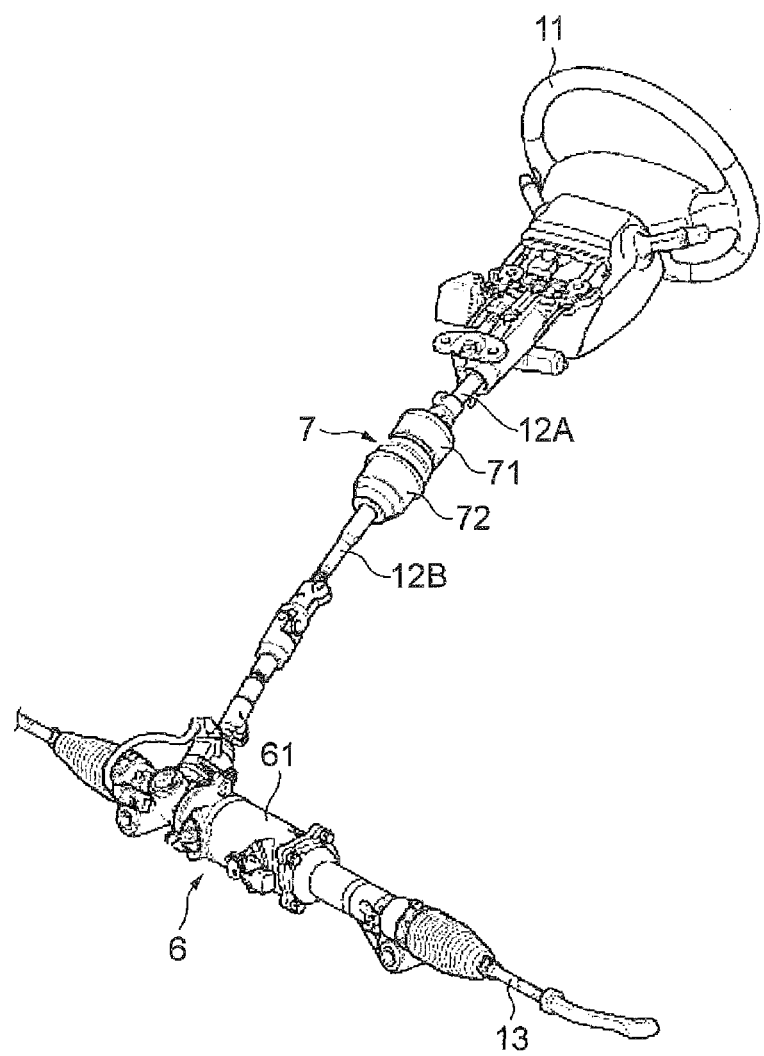
FIG. 8 is a perspective diagram illustrating a main part of an EPS and a VGRS in FIG. 7.

FIG. 8 is a perspective diagram illustrating a main part of the EPS 6 and the VGRS 7. As illustrated in FIG. 8, the steering wheel 11 is operationally connected to the EPS 6 via a steering input axis 12A, the VGRS 7, and a turning output axis 12B. The VGRS 7 includes, for example, an electric motor 71 and a decelerator 72, and appropriately changes the rotation amount (or the rotation angle) of the turning output axis 12B connected to the decelerator 72 with respect to the rotation amount (or the rotation angle) of the steering input axis 12A. The VGRS 7 causes the steering input axis 12A and the turning output axis 12B to relatively rotate and adjusts the tire angle without the rotational operation of the steering wheel 11 of the vehicle. That is, the VGRS 7 actively executes the control of the tire angle without depending on the steering operation by the driver. The transfer ratio of the VGRS 7 is variably controlled by the ECU 2.

In a case where it is determined that the elapsed time does not exceed the second time Tth2, the control amount adjustment unit 24 instructs the VGRS 7 to change the transfer ratio in addition to adding the initial control amount to the target control amount Ct calculated by the target control amount calculation unit 23. Describing specifically, the control amount adjustment unit 24 instructs the VGRS 7 to set the transfer ratio such that the rotation angle of the steering wheel becomes large compared to the tire angle. Then, the second time Tth2 is set to be longer than the first time Tth1.

Figure 9:
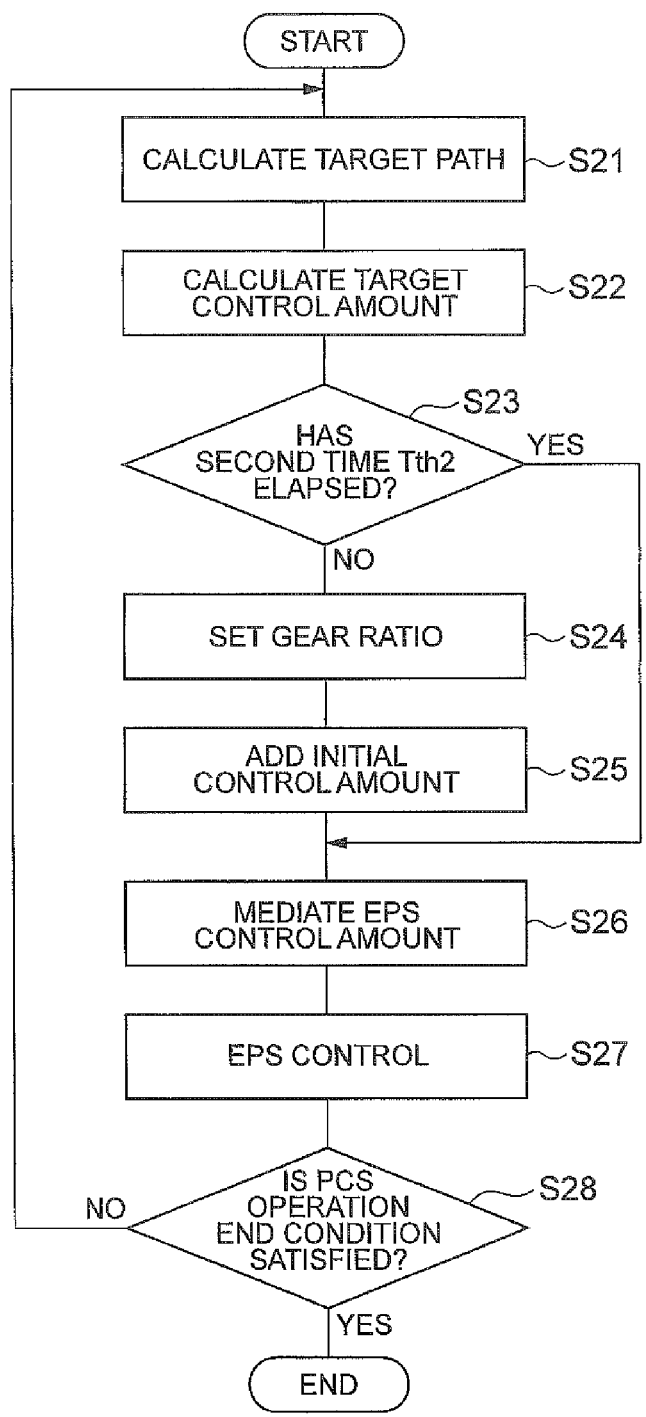
FIG. 9 is a flowchart illustrating an example of processing in the collision avoidance assistance device in FIG. 7.

Next, an example of collision avoidance assistance processing in the collision avoidance assistance device 1A will be described. FIG. 9 is a flowchart illustrating an example of processing in the collision avoidance assistance device 1A. This collision avoidance assistance processing starts in response to the determination by the PCS operation determination unit 21 that the PCS operation start condition is satisfied. At this time, the control amount adjustment unit 24 starts measuring the time elapsed since the PCS operation starts.

First, the target path calculation unit 22 calculates the target path based on the obstacle information and the travelable area information output by the surrounding information acquisition unit 3 (target path calculation step S21). Then, in order to cause the vehicle to travel along the target path calculated by the target path calculation unit 22 in the target path calculation step S21, the target control amount calculation unit 23 calculates the target control amount Ct based on the vehicle information output from the vehicle information acquisition unit 4 (target control amount calculation step S22).

Subsequently, the control amount adjustment unit 24 determines whether or not the time elapsed since commencement of the PCS operation exceeds the second time Tth2 (initial period of time elapse determination step S23). In the initial period of time elapse determination step S23, in a case where it is determined that the time elapsed since commencement of the PCS operation does not exceed the second time Tth2 (No in initial period of time elapse determination step S23), the control amount adjustment unit 24 sets the transfer ratio such that the rotation angle of the steering wheel becomes large compared to the tire angle (gear ratio setting step S24). Then, the control amount adjustment unit 24 adds the initial control amount to the target control amount Ct calculated by the target control amount calculation unit 23 in target control amount calculation step S22, and requests the addition result as the EPS control amount (initial control amount addition step S25).

On the other hand, in initial period of time elapse determination step S23, in a case where it is determined that the time elapsed since commencement of the PCS operation exceeds the second time Tth2 (Yes in initial period of time elapse determination step S23), the control amount adjustment unit 24 requests the target control amount Ct calculated by the target control amount calculation unit 23 in target control amount calculation step S22 as the EPS control amount. In a case of continuously operating the VGRS 7, the control amount adjustment unit 24 may not return the transfer ratio set in gear ratio setting step S24 to the original transfer ratio.

Subsequently, the EPS control amount mediation unit 25 mediates the EPS control amount between the EPS control and another control in which the EPS 6 is used, and determines the EPS control amount (EPS control amount mediation step S26). Then, the EPS control unit 26 controls the EPS 6 such that the EPS control amount determined by the EPS control amount mediation unit 25 in EPS control amount mediation step S26 can be realized (EPS control step S27, steering control step).

Thereafter, the PCS operation determination unit 21 determines whether or not the PCS operation end condition is satisfied (PCS operation end determination step S28). In PCS operation end determination step S28, in a case where it is determined that the PCS operation end condition is not satisfied (No in PCS operation end determination step S28), the process returns to target path calculation step S21 and the processing tasks from target path calculation step S21 to PCS operation end determination step S28 are performed again.

On the other hand, in PCS operation end determination step S28, in a case where it is determined that the PCS operation end condition is satisfied (Yes in PCS operation end determination step S28), the collision avoidance assistance processing in the collision avoidance assistance device 1A ends. In the ordinary steering, in a case of continuously operating the VGRS 7, the control amount adjustment unit 24 may not return the transfer ratio set in gear ratio setting step S24 to the original transfer ratio. In addition, in the ordinary steering, in a case of not operating the VGRS 7, the control amount adjustment unit 24 may return the transfer ratio set in gear ratio setting step S24 to the original transfer ratio.

FIG. 10 includes (a) a diagram illustrating an example of a time change of an EPS output steering torque in the collision avoidance assistance device 1A, and (b) a diagram illustrating an example of a time change of a lateral acceleration in the collision avoidance assistance device 1A. In (a) in FIG. 10, the horizontal axis represents the time elapsed since commencement of the PCS operation and the vertical axis represents the EPS output steering torque. In (b) in FIG. 10, the horizontal axis represents the time elapsed since commencement of the PCS operation and the vertical axis represents the lateral acceleration. Here, the steering torque is used as the EPS control amount, however, another control amount may be used.

As illustrated in FIG. 10, the collision avoidance assistance device 1A rotates the steering wheel with the steering torque in which the initial steering torque is added to the target steering torque Ct during the period from commencement of the PCS operation to elapsing of the second time Tth2, and rotates the steering wheel with the target steering torque Ct after the second time Tth2 has elapsed. This second time Tth2 is set to a value greater than the first time Tth1. As described above, during the period longer than the elapsed time of the first time Tth1, although the steering wheel is rotated by the steering torque greater than the target steering torque Ct, it is understood that the increase of the lateral acceleration occurring on the vehicle is suppressed.

In the collision avoidance assistance device 1A, during the period from commencement of the PCS operation to elapsing of the second time Tth2, the transfer ratio is set such that the rotation angle of the steering wheel becomes large compared to the tire angle by the VGRS 7. In this way, even when the steering wheel is rotated by the steering torque in which the initial steering torque is added to the target steering torque Ct, the tire angle becomes small compared to that of the collision avoidance assistance device 1, and thus, it is possible to reduce the increase of the lateral acceleration. For this reason, during the period longer than the elapsed time of the first time Tth1, even when the steering wheel is rotated with the steering torque in which the initial steering torque is added to the target steering torque Ct, it is possible to suppress the occurrence of the sideslip That is, in the collision avoidance assistance device 1A, it is possible to continuously output the initial steering torque during the period time equal to or longer than the first time Tth1 while suppressing the lateral acceleration to become such a low level as the sideslip does not occur (for example, 0.1 G on the icy road).

In addition, the steering torque output during the period from commencement of the PCS operation to elapsing of the second time Tth2 is greater than the steering holding force of the driver. Therefore, it is possible to reliably rotate the steering wheel. Then, since the steering torque which is greater than the steering holding force of the driver is output during the period from commencement of the PCS operation to elapsing of the second time Tth2, it is possible to make the driver reliably recognize the PCS operation compared to the case in the collision avoidance assistance device 1. As a result, the uncomfortable feeling to the driver can be suppressed and it is possible to further decrease the possibility of the steering assistance being cancelled. That is, in the collision avoidance assistance device 1A, it is possible to make the driver reliably recognize the PCS operation while suppressing the lateral acceleration by making the force occurring in the steering wheel be large while suppressing the behavior of the vehicle by the VGRS 7.

In addition, during the period from commencement of the PCS operation to elapsing of the second time Tth2, the steering torque having the same direction as the direction of the steering assistance of the PCS is output. Therefore, it is possible to make the driver recognize the direction of the collision avoidance by the PCS. As a result, the uncomfortable feeling to the driver can be suppressed and it is possible to decrease the possibility of the steering assistance being cancelled.

The present invention is not limited to the embodiments described above. For example, instead of the EPS 6, the collision avoidance assistance device 1 may include a steering actuator that changes the direction of the vehicle such as an electronic hydraulic power steering (EHPS) device, a steer-by-wire, and a VGRS and an active rear steer (ARS).

In addition, instead of the EPS 6 and the VGRS 7, the collision avoidance assistance device 1A may include a calculation ECU of steer-by-wire.

INDUSTRIAL APPLICABILITY

The present invention can be used in a collision avoidance assistance device and a collision avoidance assistance method.

REFERENCE SIGNS LIST 1, 1A collision avoidance assistance device
7 variable gear ratio steering (gear ratio control unit)
11 steering wheel
23 target control amount calculation unit
24 control amount adjustment unit
26 EPS control unit (steering control unit)
Ct target control amount
S16, S27 control step (steering control step)
Tth1 first time
Tth2 second time

The invention claimed is:

1. A collision avoidance assistance device configured to perform driver steering assistance to avoid a collision between a vehicle and an obstacle, the device comprising:
   a steering control unit configured to perform the steering assistance in a case where it is determined that there is a possibility of the collision between the vehicle and the obstacle,
   wherein, during a period from commencement of the steering assistance to elapsing of a first time determined by response characteristics of a lateral acceleration of the vehicle, the steering control unit is configured to rotate a steering wheel of the vehicle in a collision avoidance direction by a control amount determined based on a steering holding force of the driver,
   wherein the control amount is set to a value greater than the steering holding force, and
   wherein the first time is set to be shorter than a delay time that is a period during which the lateral acceleration on the vehicle is suppressed when the steering assistance is performed by the steering control unit.

2. The collision avoidance assistance device according to claim 1,
   wherein, at the time of or after commencement of the steering assistance, the steering control unit is configured to end the steering assistance in response to detecting the steering operation of the steering wheel by the driver as being equal to or greater than a predetermined amount.

3. The collision avoidance assistance device according to claim 1, further comprising:
   a target control amount calculation unit configured to calculate a target control amount for travelling on a target path through which the vehicle is to travel for avoiding the collision with the obstacle; and
   a control amount adjustment unit configured to obtain a designated control amount by adding an initial control amount to the target control amount during the period from commencement of the steering assistance to elapsing of the first time, and to adopt the target control amount as the designated control amount after the first time has elapsed since commencement of the steering assistance,
   wherein the steering control unit is configured to perform the steering assistance by rotating the steering wheel by the designated control amount.

4. The collision avoidance assistance device according to claim 1, further comprising:
   a gear ratio control unit configured to variably control a gear ratio which is a ratio between a rotation angle of the steering wheel of the vehicle and a tire angle of the vehicle,
   wherein the gear ratio control unit is configured to set the gear ratio such that the rotation angle of the steering wheel becomes greater than the tire angle during a period from commencement of the steering assistance to elapsing of a second time which is longer than the first time determined by response characteristics of a lateral acceleration of the vehicle, and
   wherein, during the period from commencement of the steering assistance to elapsing of the second time, the steering control unit is configured to rotate the steering wheel in the collision avoidance direction by the control amount determined based on the steering holding force of the driver.

5. A collision avoidance assistance method for performing driver steering assistance to avoid a collision between a vehicle and an obstacle, the method comprising:
   a steering control step of performing the steering assistance in a case where it is determined that there is a possibility of the collision between the vehicle and the obstacle,
   wherein, in the steering control step, during a period from commencement of the steering assistance to elapsing of a first time determined by response characteristics of a lateral acceleration of the vehicle, the steering wheel of the vehicle is rotated in the collision avoidance direction by the control amount determined based on the steering holding force of the driver,
   wherein the control amount is set to a value greater than the steering holding force, and
   wherein the first time is set to be shorter than a delay time that is a period during which the lateral acceleration on the vehicle is suppressed when the steering assistance is performed by the steering control unit.

* * * * *